(No Model.)

T. E. KING.
MITER BOX.

No. 562,899. Patented June 30, 1896.

Scale ⊢——⊣ = 1in.

WITNESSES:

INVENTOR
T. E. King

UNITED STATES PATENT OFFICE.

THEODORE E. KING, OF WESTPORT, CONNECTICUT.

MITER-BOX.

SPECIFICATION forming part of Letters Patent No. 562,899, dated June 30, 1896.

Application filed April 23, 1896. Serial No. 588,711. (No model.)

*To all whom it may concern:*

Be it known that I, THEODORE E. KING, a citizen of the United States, residing at Westport, in the county of Fairfield and State of Connecticut, have invented certain new and useful Improvements in Miter-Boxes; and I do hereby declare the following to be a full, clear, and exact description of the invention, such as will enable others skilled in the art to which it appertains to make and use the same.

My invention relates to certain new and useful improvements in miter-boxes, and has for its object to provide a very simple and effective device of this description.

Figure 1:
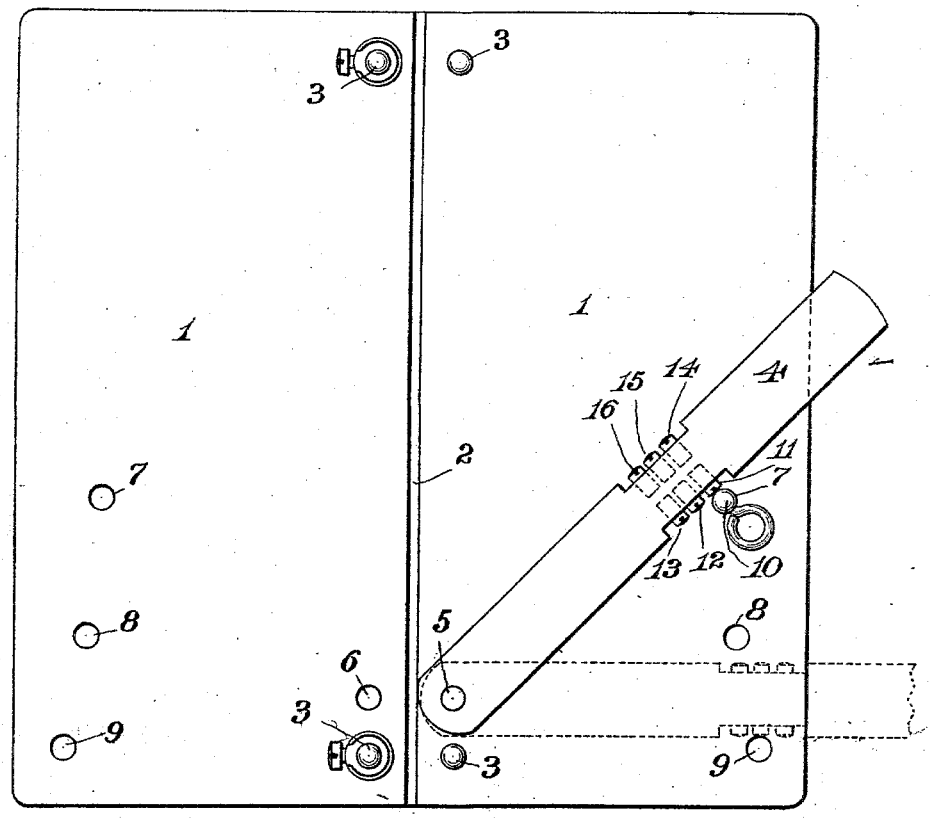
Figure 2:
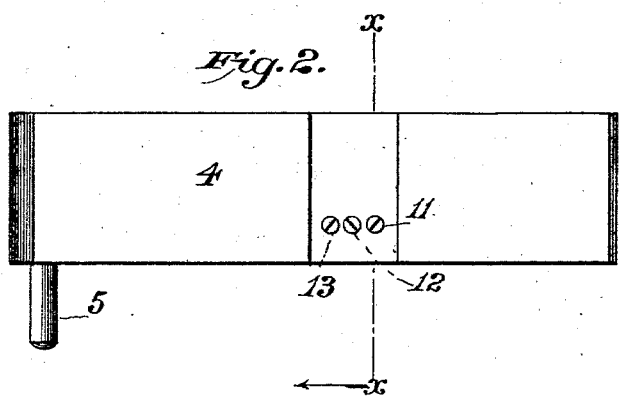
Figure 3:
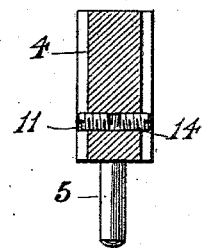

In the accompanying drawings, which form a part of this application, Figure 1 is a plan view of my improvement; Fig. 2, a detail elevation of the angle-bar, and Fig. 3 a section at the line $x\ x$ of Fig. 2.

Similar numbers of reference denote like parts in the several figures of the drawings.

1 is the bed, made of any suitable material and provided with the usual saw-cut guide 2 and the upright pins 3 for the saw-frame.

As my present invention has nothing whatever to do with the saw or any manner of attaching the same, I have not shown and will not describe any saw-frame or saw, and, moreover, my improvement may be used in connection with any ordinary saw guided and attached to the miter-box in any suitable and ordinary manner.

4 is an angle-bar, provided at its inner end with a dowel-pin 5, which latter is inserted within a circular perforation 6 in the bed near the front end of the same, leaving said bar free to swing radially from this point. There are two of these perforations 6 on opposite sides of the cut 2, but only one of which appears, since the dowel-pin of the angle-bar is within the other, and such bar therefore hides the same.

The bed is perforated on opposite sides of the cut 2, so as to provide circular openings 7 8 9 on each side. Both sets of these openings are so located that a pin 10 inserted therein will afford a stop against which the angle-bar will abut, so as to bring said bar positively to the angular adjustment desired in sawing a molding. In the drawings this pin is shown in the hole 7, and the adjustment of the bar 4 thus provided for is at an angle of forty-five degrees. A different adjustment is of course afforded by placing the pin 10 in the hole 8, and when said pin is placed in the hole 9 near the front of the bed the bar 4, when abutted against said pin, will be at right angles to the cut 2, and this adjustment is of course desirable when sawing straight across the end of a molding.

In sawing a molding for one member of a joint the bar 4 is operated and adjusted at one side of the cut 2, while in sawing the molding for the other member of such joint the dowel-pin 5 is lifted out of the perforation 6, which it has occupied, and inserted within the corresponding perforation on the opposite side of the cut 2, the pin 10 being of course inserted within the holes on this side of the cut 2 for the proper angular adjustment of said bar.

Unless great care is taken in locating the circular perforations 6, 7, 8, and 9, there is apt to be a slight variation from the proper angular adjustment desired for this bar, and I have therefore provided means whereby any such variation may be readily compensated for, which means I will now describe.

Driven within opposite sides of the bar 4 are screws 11 12 13 and 14 15 16, which screws correspond in number with the positive adjustments of the bar which are provided for. For instance, there are three adjustments for which I have provided, and there are therefore three of these screws on each side of the bar. These screws are, moreover, so located that they will constitute the respective points of abutment of the bar when the latter is swung to its several adjustments against the pin 10. Should it be ascertained that the angular adjustment of the bar is too obtuse, the screw in abutment with the pin 10 is simply backed a trifle until the proper adjustment is obtained, and such screw is of course driven inward in order to bring about the proper adjustment of the bar when it is found that the angle is too acute. The bar 4 is recessed at each side, and the set-screws project from the body of the bar within the recess, so that a piece of work may bear against the side of the bar without touching the set-screws, although such set-screws are in position to engage the pin which regulates the angle. This adjustment is a very advantageous feature, since it insures great accuracy.

Of course the number of circular perforations in the bed may be increased to provide for more adjustments, if desired, and also angles may be laid out by drawing lines which radiate across the bed, and I therefore do not wish to be limited in this respect.

Having thus described my invention, what I claim as new, and desire to secure by Letters Patent, is—

1. The perforated bed having saw-cut guide, and upright pins for the saw-frame, the bar having a pivot-pin near its end which may enter a circular perforation in the bed, such perforation being at each side of the saw-cut guide, movable pins in the bed entering perforations arranged at various angles relatively to the pivot-pin and saw-cut guide, and set-screws on the bar in position to engage the movable pins on the bed, all combined substantially as described.

2. In a mitering device, the bed having saw-groove, the saw-guides connected to said bed, the angularly-adjustable bar having recesses therein and set-screws in the recesses, and the movable pins entering perforations in said bed and forming bearings for the set-screws in the bar, all combined substantially as described.

In testimony whereof I affix my signature in presence of two witnesses.

THEODORE E. KING.

Witnesses:
WM. EDGAR NASH,
FREDK. M. SALMON.